(12) United States Patent
Boudereau et al.

(10) Patent No.: US 7,509,736 B2
(45) Date of Patent: Mar. 31, 2009

(54) PROCESS FOR REPAIRING METALLIC PIECES ESPECIALLY TURBINE BLADES OF A GAS TURBINE MOTOR

(75) Inventors: Christian Boudereau, Moissy Cramayel (FR); Michel Boulnois, Lieusaint (FR); Hassan Boussaboun, Deuil la Barre (FR); Charles Caruana, Asnieres (FR); Jean-Marc Caux, Saint Brice (FR); Francis Chareyre, Franconville (FR); Gerard Defrocourt, Sannois (FR); Patrick Herault, Saint Leu d'esserent (FR); Clement Sampaio, Montmagny (FR); Jean-Jacques Varin, Pointoise (FR)

(73) Assignee: Snecma, Paris (FR)

( * ) Notice: Subject to any disclaimer, the term of this patent is extended or adjusted under 35 U.S.C. 154(b) by 538 days.

(21) Appl. No.: 10/960,704

(22) Filed: Oct. 8, 2004

(65) Prior Publication Data

US 2005/0120555 A1    Jun. 9, 2005

(30) Foreign Application Priority Data

Oct. 10, 2003   (FR) .................................. 03 11885

(51) Int. Cl.
*B23P 6/00* (2006.01)
(52) U.S. Cl. ................ 29/889.1; 29/402.05; 29/402.06; 29/402.07; 29/402.18; 29/402.19
(58) Field of Classification Search ................ 29/889.1, 29/402.01, 402.05, 402.06, 402.07, 402.09, 29/402.11, 402.13, 402.16, 402.18, 402.19
See application file for complete search history.

(56) References Cited

U.S. PATENT DOCUMENTS

| 4,155,152 | A |   | 5/1979  | Cretella et al.            |
|-----------|---|---|---------|----------------------------|
| 4,219,592 | A |   | 8/1980  | Anderson et al.            |
| 4,291,448 | A | * | 9/1981  | Cretella et al. ............. 29/889.1 |
| 5,448,828 | A | * | 9/1995  | Willems et al. ............ 29/889.1 |
| 5,685,765 | A | * | 11/1997 | Azpeitia De Diego ......... 451/9 |
| 5,794,338 | A | * | 8/1998  | Bowden et al. ............ 29/889.1 |
| 6,042,880 | A | * | 3/2000  | Rigney et al. ............... 427/142 |
| 6,164,916 | A | * | 12/2000 | Frost et al. ................... 416/189 |
| 6,203,847 | B1| * | 3/2001  | Conner et al. ............... 427/142 |
| 6,233,822 | B1| * | 5/2001  | Grossklaus et al. ........ 29/889.1 |
| 6,328,636 | B1| * | 12/2001 | Yoshimi et al. ............... 451/56 |
| 6,434,823 | B1| * | 8/2002  | Gupta et al. ............... 29/889.1 |
| 6,543,134 | B2| * | 4/2003  | Meier ........................ 29/889.1 |

(Continued)

FOREIGN PATENT DOCUMENTS

DE    36 44 702 A1    7/1988

(Continued)

*Primary Examiner*—Essama Omgba
(74) *Attorney, Agent, or Firm*—Oblon, Spivak, McClelland, Maier & Neustadt, P.C.

(57) ABSTRACT

A process for repairing a metallic shroud of a gas turbine blade includes a step of removing a portion of an anti-wear layer to a removal depth that is greater than a depth of wear of the anti-wear layer. Further, the process includes a step of leaving a trace of the anti-wear layer to subsist, wherein the trace of the anti-wear layer extends at least in a re-entrant zone of the Z profile of the blade. The process also includes a step of depositing a new layer of anti-wear material on the trace of the anti-wear layer.

12 Claims, 2 Drawing Sheets

U.S. PATENT DOCUMENTS

| | | | |
|---|---|---|---|
| 6,562,089 B1 * | 5/2003 | Iwai et al. | 51/298 |
| 6,569,492 B2 * | 5/2003 | Fernihough et al. | 427/142 |
| 6,588,103 B2 * | 7/2003 | Fernihough et al. | 29/889.1 |
| 6,811,379 B2 * | 11/2004 | Fernihough et al. | 416/241 R |
| 6,955,308 B2 * | 10/2005 | Segrest et al. | 241/1 |
| 7,009,137 B2 * | 3/2006 | Guo | 219/121.64 |
| 7,078,073 B2 * | 7/2006 | Rigney et al. | 427/142 |
| 2002/0091459 A1 * | 7/2002 | Meier | 700/159 |

FOREIGN PATENT DOCUMENTS

| | | |
|---|---|---|
| EP | 1 136 593 A1 | 9/2001 |
| EP | 1 153 699 A2 | 11/2001 |
| FR | 2 292 107 | 6/1976 |

\* cited by examiner

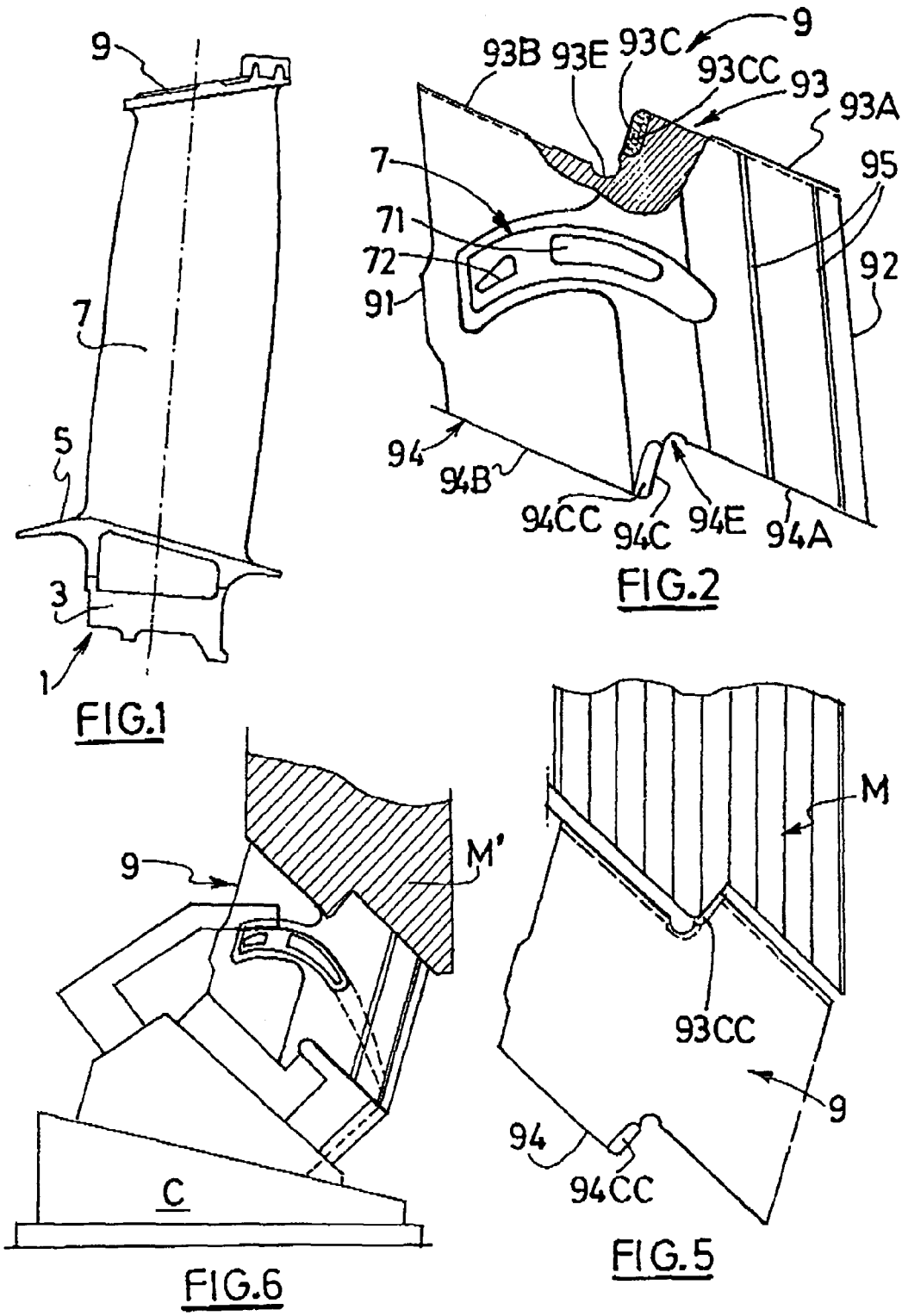

PROCESS FOR REPAIRING METALLIC PIECES ESPECIALLY TURBINE BLADES OF A GAS TURBINE MOTOR

BACKGROUND OF THE INVENTION

1. Field of the Invention

The present invention concerns metallic pieces and especially gas turbine blades. In particular, it focuses on repair of the parts of blades which are coated with a layer of an anti-wear material for resisting constraints due to major friction during operation of the motor. The repair process applies to the mobile rotor blades or fixed stator vanes.

2. Discussion of the Background

A mobile turbine blade comprises a root portion by which it is fixed to the disc of the rotor, a platform delimiting the gas vein and an aerofoil portion. According to the motor and the turbine stage, the aerofoil portion terminates, at its end remote from the root, in a transversal element, known as a shroud, which delimits the external surface of the gas vein. The shroud comprises a leading edge and a trailing edge oriented transversally relative to the direction of flow of the gas. The two edges are connected by two lateral edges with which the shroud makes contact with the shrouds of the two adjacent blades on the rotor. These lateral edges have a so-called Z profile: two axial portions are interconnected by a substantially transversal portion.

With the aim of damping the vibrations to which they are subjected during operation, the blades are mounted on the disc with a torsion constraint about their main axis. The shrouds are designed such that the blades are thus placed under torsion constraint when supported with their adjacent blades along said portions transversal surface. Due to the vibrations and strain transmitted between the two surfaces in contact, friction under tension results which is a major factor of wear.

This problem of wear is also encountered on the contact surfaces of the internal platforms of the blades or the distributor sectors. The lateral edges of the blades or the adjacent sectors are in the form of Z likewise with a transverse portion in particular. Due to vibrations these parts are the seat of wear.

The material constituting the blade is generally low resistant to these phenomena of wear in the operating conditions of the motor. In order to prolong the shelf life of the piece, its sensitive parts mentioned hereinabove are protected, by applying a material resistant to wear. This can be small plates of a specific alloy exhibiting increased hardness which is brazed onto the metallic substrate, as is described in the U.S. Pat. No. 6,164,916 and which form the support surfaces with the adjacent pieces. According to another known technique, to manufacture new pieces progressive loading of the surface to be protected is commenced possibly after the material of the substrate has been removed locally by grinding, to a determined depth, by means of a rod of an anti-wear material which is fused at the same time as the upper layer of the metallic substrate. The necessary heat is contributed by means of an appropriate source. This can be produced by an electric arc sheath of inert gas or else by a laser beam.

SUMMARY OF THE INVENTION

The present invention relates to the pieces comprising a surface resistant to wear produced by loading material anti-wear by soldering. This technique is designated in the field by the term "stelliting". In accordance with this technique an alloy based on cobalt is used. These cobalt alloys are marketed for example under the trade mark "Stellite".

In spite of the protection conferred by the anti-wear layer, the contact zones cannot be prevented from being altered due to friction and severe operating conditions. Beyond a certain threshold of wear it is necessary to repair and restore the geometry of the blade. In the case of turbine blades for example if the loss of material by wear becomes too great, then the torsion constraint on the blade disappears leaving the place to vibratory phenomena.

The object of the present invention is the repair of such pieces whereof the anti-wear zones produced by loading of material are damaged and are no longer possibly functional.

According to the present invention the repair process of a metallic piece of a gas turbine motor locally comprising an original anti-wear layer formed by loading by welding of an anti-wear material and whereof said layer is partially worn is characterised in that it comprises a rectification stage of the anti-wear layer in which a trace of said original anti-wear layer, and a deposit stage by welding of a new layer of anti-wear material, is left to subsist on at least a part of the base of the rectified zone.

The anti-wear material is preferably a cobalt-based alloy generally utilised in the field and adapted to the application.

Satisfactory adhesion of the material is ensured which is later applied by soldering by the process of the invention, as is also in particular the conservation of a trace of anti-wear material in the base of the rectified zone. It was also surprisingly discovered that this intermediate layer formed sufficient means of protection during soldering to avoid propagation of faults in the metallic substrate. This protection is particularly advantageous in the part of the Z profile which is situated in the re-entrant angle between the longitudinal portion and the coated transverse portion of anti-wear material. This part is critical since it is the preferred seat where defaults form.

Accordingly, when repair concerns a face of a Z profile, the trace extends at least in the re-entrant zone of the profile. By way of advantage, rectification of the original layer is proceeded with, in such a way that the trace forms an intermediate layer between the metallic substrate and the new layer. The trace, after rectification, in this case extends over the entire base of the rectified zone.

The process also applies both to a mobile blade and to a stator vane. In particular, it applies to a mobile turbine blade with shroud, whereof the shroud is in a Z profile and comprises a pit at the base of the profile. Such a pit consists of a bore with a rounded profile in the re-entrant zone of the Z. Its aim is to prevent development of cracks in this zone.

According to another characteristic, with the process being applied to a shroud blade with Z profile, the anti-wear layer is rectified by means of a grinding wheel placed so as to remove a quantity of material to a determined depth relative to the initial side of the surface of the anti-wear layer. If necessary, the grinding wheel comprises a Z profile. For example, the grinding wheel itself is rectified continuously during the rectification stage of the shroud. This characteristic allows automation of the rectification procedure of the pieces.

The object of the invention is likewise a process including the control, using a non-destructive method such as sweating, of the quality of the repair and in particular of the presence or not of defects.

According to another characteristic this object is achieved, before deposit of a new layer of anti-wear material, by commencing a cleaning stage so as to eliminate any deposit of pollution and/or oxidation resulting from the utilisation of the piece. In particular the cleaning stage comprises a chemical cleaning stage followed by a sand blasting stage.

In fact the pieces to be repaired have functioned in environments generating surface deposits. Appropriate cleaning prevents any deposit capable of polluting the walls of the oven during the heating stage under vacuum before non-destructive control such as sweating.

According to another characteristic sand blasting is carried out with a powder of low granulometry, from 40 to 90 µm, in particular a granulometry of 50 µm. This effectively avoids damaging the coating of the aerofoil portion.

According to another characteristic, in the process being applied to a blade comprising surface orifices for evacuation of cooling air, air is insufflated via the aerofoil portion and sand blasting is performed dry, the entrainment air being at a pressure less than that of the insufflated air.

BRIEF DESCRIPTION OF THE DRAWINGS

Other advantages and characteristics of the process will emerge from the following description of an embodiment of the process of the invention, with reference to the diagrams, in which:

FIG. 1 illustrates a turbine blade with shroud, in side elevation,

FIG. 2 illustrates a turbine blade with shroud in plan view,

FIG. 5 is a side elevation FIG. 4, FIG. 6 illustrates the shroud of the blade and of the finishing grinding wheel in position.

DETAIL DESCRIPTION OF THE PREFERRED EMBODIMENTS

Figure 3:
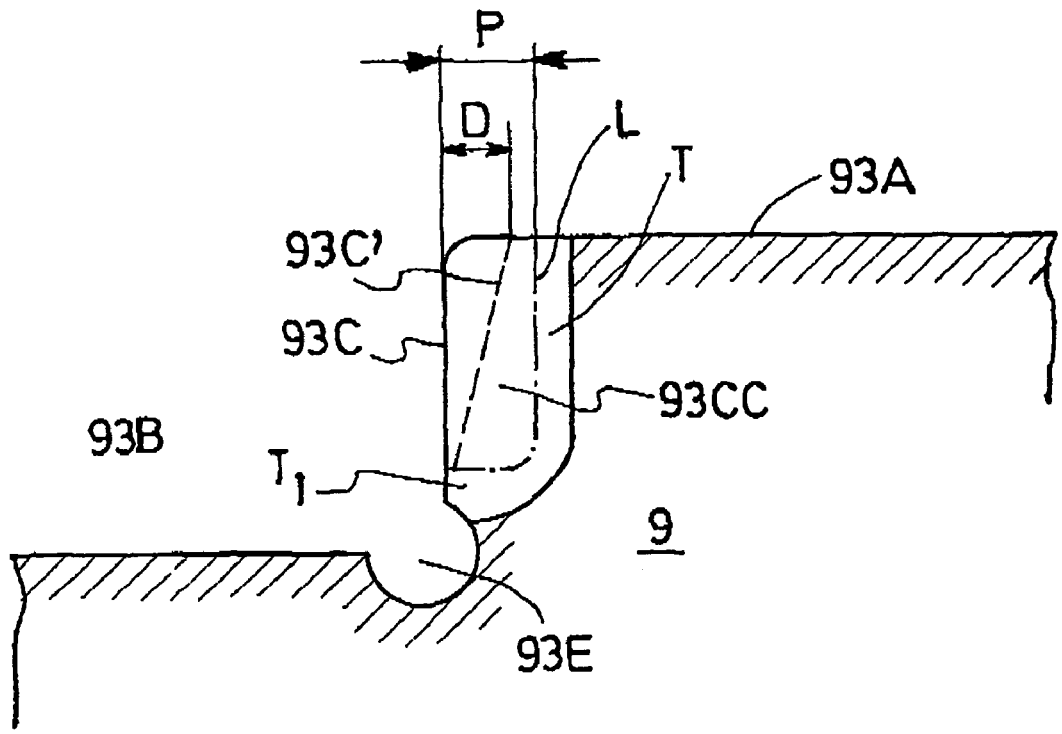
FIG. 3 illustrates an enlarged view of the part of the shroud comprising an anti-wear layer.

FIGS. 1 and 2 illustrate a turbine blade utilised in a high-pressure stage of a motor subjected to extreme conditions, such as for example a military engine. This blade comprises a root portion 3, a platform 5 forming an element of the internal wall delimiting the gas vein which passes through the turbine and the aerofoil portion 7 which is swept by the gas. The aerofoil portion 7 is united at the radially outer tip with a shroud 9, forming an element of the external wall delimiting the gas vein which passes through the turbine stage on which the blade is mounted. FIG. 2 shows the shroud 9 in plan view.

In this model the shroud, having a general parallelepiped shape, comprises an upstream face 91 perpendicular to the gaseous flux, a downstream face 92 which is parallel to the former, and two lateral faces 93 and 94 which connect the two preceding. This figure also shows the upper end the aerofoil portion 7 with its vents 71, 72 for cooling fluid which has passed through the internal cavities. Two blades 95, parallel to the upstream and downstream faces, form labyrinth joint with the wall of the non-visible adjacent stator in the figure. The side wall 93 of the shroud comprises two longitudinal portions 93A and 93B parallel to one another and offset relative to one another. They are connected by a wall element 93C here forming an angle of 80° with the wall 93B. The ensemble of the three elements 93A 93B and 93C forms a so-called Z profile. This wall element 93C is coated with a layer 93CC of anti-wear material, such as a cobalt alloy from the range of products marketed under the brand name "Stellite". This layer has been obtained, according to a known process, optionally by disengaging the metallic substrate at a preset depth, then by contribution of anti-wear material. The contribution is generally made by TIG soldering or laser.

In the same way, the wall 94 comprises two parallel parts 94A and 94B connected by a transversal wall 94C. The latter is oriented in the opposite direction to that of the wall 93C.

The layers 93CC and 94CC have a preset thickness, of the order of 1 to 3 mm for example. After the blades are mounted on the rotor, each shroud is supported, due to the torsion constraint applied to the aerofoils portions, on the shrouds of the adjacent two blades by the transversal wall elements 93C and 94C.

In the example illustrated in FIG. 2 machining in the arc of a circle, a pit 93E, has been made in the zone forming the apex of the re-entrant angle formed by the two elements 93C and 93B. The same applies on the other lateral face 94 with the pit 94E.

FIG. 3 shows the enlarged zone of the layer 93CC. This layer, by being subjected to the above mentioned friction efforts, wears until, after a certain number of operating cycles of the motor, the surface 93C backs in 93C' marked in dotted lines.

If the wear is not excessive, less than a preset distance D relative to the initial side of the surface 93C, it becomes economical to repair the blade. This is the object of the process of the invention.

According to a first stage, part of the layer 93CC, 94CC respectively is removed.

Figure 4:
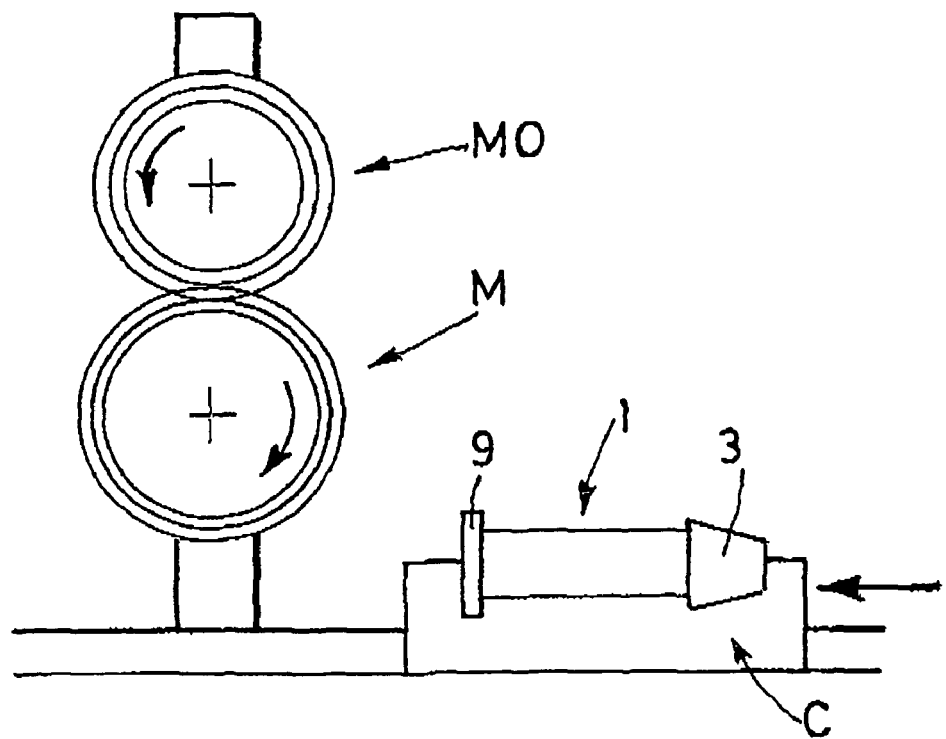
FIG. 4 is a schematic representation of a rectification installation by grinding.

An installation performing this stage of the process has been illustrated schematically in FIG. 4. The installation comprises a grinding wheel M of profile in the form of Z complementary to that of the face 93 or 94 respectively. A thumbwheel MO having a surface of diamond type is placed against the grinding wheel and is designed to regenerate its profile. A carriage C is entrained on rails perpendicularly to the axis of the grinding wheel. This carriage supports the blade such that displacement of the shroud 9 is tangential to the Z surface of the grinding wheel, with contact on a preset depth for the transversal part 93C or 94C of the profile. Mounting of the blade on the carriage C is also evident in FIG. 6.

FIG. 5, which is a view according to the direction of displacement of the carriage, shows that the grinding wheel M removes a quantity of material in the layer 93CC, 94CC respectively to a depth determined by regulating the position of the carriage relative to the grinding wheel. This regulating is carried out by lateral displacement of the carriage. FIG. 3 illustrates the limit L of the initiation of the layer by the grinding wheel M via a dashed line.

The depth P of the removal of material relative to the initial side of the surface 93C respectively 94C, of the layer 93CC respectively 94CC in the new state is determined. Knowing for example that this layer has a thickness of 3 mm for example in the new state, the material is removed by grinding down to a depth of 1 mm, knowing that P is at least equal to D, the depth of wear.

As seen in FIGS. 3 and 5, there is advantageously a trace T over the entire length of the anti-wear layer. The material has not been removed down to the metallic substrate. The invention however covers the case where the layer is hollowed out so as to leave a trace on only part of the base of the rectified zone. This trace constitutes an adhesion zone for later welding.

In accordance with a characteristic of the invention at least a trace T1 of anti-wear material is retained on the part adjacent to the pit 93 E respectively 94 E.

The rectification stage also comprises a phase by which, if needed, grinding is used to eliminate the protective coating of the blade in the vicinity of the rectified zone to lay bare the metal constituting the blade. For the shroud, its external face and its internal face are ground in a zone adjacent to the layers 93CC and 94 CC respectively.

The process comprises a cleaning stage of the blade. This stage can be effected before rectification of the anti-wear layer or else following the latter.

The blades which are selected for repair generally comprise deposit of hard extraneous material whereof the composition, oxidation products or pollutants, depends on particularly environmental conditions in which the motor has operated. It is important to abolish this deposit prior to passing into the oven under vacuum, since the material making up said deposit would pollute the walls of the latter and disturb later processing.

Cleaning is commenced such that the protective coating of minimal thickness of the aerofoil portion is not altered.

The extent of cleaning comprises alkaline degreasing, followed by chemical pickling. The latter is carried out by passing the piece through several specific baths, which is up to the specialist to prepare. They comprise successively for example a strong alkaline bath, a stagger, a permanganate bath and a weak acid bath to neutralise the strong alkaline attacks.

Cleaning ends with dry sand blasting, with corundum for example. The granulometry is low, 50 µm for example, so as not to damage the coating.

When the blade comprises holes for evacuation of cooling air on the aerofoil portion, in the most general scenario, during the sand blasting operation the air in the blade is insufflated via the internal cavities of the blade to avoid grains blocking it. To this end, it is ensured that the pressure of the sand blasting air is less than that of the air escaping via the orifices of the aerofoil portion.

The piece thus cleaned and rectified is conveyed to the soldering post, for example of TIG type.

The soldering is performed with a tungsten electrode under inert gas, argon for example.

The filler metal is the same as that making up the trace of the initial anti-wear layer. It is applied in successive drops; there are 6 or 7 of them, for example. The form of the trace in particular of the part T1 ensures that the deposit of material is not brought into the zone of the pit, 93 E or 94 E, and prevents defects from developing.

Once the anti-wear metal filler is completed, final machining is commenced to return the layer to the nominal profile. For this purpose a grinding wheel having a profile complementary to that of the shroud is employed. FIG. 6 illustrates in a view along the aerofoil portion the disposition of the shroud relative to the grinding wheel M' after rectification. The profile of the latter corresponds preferably exactly to that of the shroud. It is observed in particular that the grinding wheel has a bead which adapts in the pit.

When the piece is thus machined and returned to the initial side, repair operations are completed by proceeding with control focussing on detecting the presence of defects, such as cracks, possibly formed by soldering.

The piece is prepared by subjecting it over a predetermined period to thermal treatment in an oven under vacuum to relieve the constraints, and if necessary open the cracks which might have formed.

The next step is testing by penetrant inspection. This mode of testing consists of applying a fluorescent liquid, known as a penetrant, to the surface to be checked. This liquid penetrates inside the defects existing in the form of fissures and porosity. The excess penetrant is eliminated by washing. Any defects are made visible by illuminating the piece with an ultra-violet lamp.

The invention claimed is:

1. A process for repairing a metallic shroud of a gas turbine blade comprising an anti-wear layer of cobalt-based alloy over a metallic substrate, wherein said shroud has a leading edge and a trailing edge oriented transversely relative to a direction of flow of gas, the two edges being connected by two lateral edges that have a Z profile with two axial portions interconnected by a substantially transversal portion, said process comprising the steps of:
   removing a portion of said anti-wear layer of cobalt-based alloy to a removal depth that is greater than a depth of wear of said anti-wear layer;
   leaving a trace of said anti-wear layer of cobalt-based alloy to subsist above said metallic substrate, wherein said trace of said anti-wear layer extends at least in a re-entrant zone of the Z profile; and
   applying drops of said cobalt-based alloy to contact said trace thereby soldering a new layer of anti-wear material of cobalt-based alloy on said trace of said anti-wear layer,
   wherein said removing step is performed such that said trace has a shape that ensures that said drops of the cobalt-based alloy are not brought into a zone free of said trace of cobalt-based alloy.

2. The process as claimed in claim 1, wherein said blade is a mobile blade or stator vane.

3. The process as claimed in claim 1, wherein said removing step is performed with a grinding wheel placed so as to remove a preset thickness of material relative to the initial side of the surface of said anti-wear layer.

4. The process as claimed in claim 3, wherein the grinding wheel comprises a Z profile.

5. The process as claimed in claim 4, further comprising rectifying the grinding wheel continuously during the step of removing said portion of said anti-wear layer.

6. The process as claimed in claim 5, comprising before said step of depositing said new layer of anti-wear material, cleaning said metallic shroud so as to eliminate any deposit of pollution and/or oxidation resulting from utilisation of the metallic shroud.

7. The process as claimed in claim 6, wherein said cleaning comprises chemical cleaning followed by sand blasting.

8. The process as claimed in claim 7, wherein said sand blasting is performed with a powder of low granulometry.

9. The process as claimed in claim 8, wherein said sand blasting is performed dry, with an entrainment air being at a pressure below that of air insufflated in orifices in said blade.

10. The process as claimed in claim 1, further comprising a non-destructive control step of the shroud.

11. A process according to claim 1,
   wherein said removing step is performed with a grinding wheel and said method further comprises a step of rectifying the grinding wheel during the step of removing said portion of said anti-wear layer.

12. The process as claimed in claim 1, wherein said step of removing is performed without removing said anti-wear layer down to the metallic substrate for any portion of said anti-wear layer, and such that said trace extends over the entire length of the anti-wear layer.

* * * * *